US006233384B1

(12) United States Patent
Sowell, III et al.

(10) Patent No.: US 6,233,384 B1
(45) Date of Patent: May 15, 2001

(54) RUGGEDIZED FIBER OPTIC CABLE

(75) Inventors: Robert L. Sowell, III, Elkton, MD (US); Varghese J. Maniyatte, Bear; Donald M. Schuett, Newark, both of DE (US); Mark T. von Kleeck, Elkton, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 09/247,851

(22) Filed: Feb. 11, 1999

(51) Int. Cl.[7] ........................................... G02B 6/44
(52) U.S. Cl. .................. 385/107; 385/101; 385/102; 385/103
(58) Field of Search ................... 385/101, 102, 385/103, 104, 105, 116, 107, 111, 112, 113; 174/105 R, 106 R, 110 F, 107–109

(56) References Cited

U.S. PATENT DOCUMENTS

| | | | |
|---|---|---|---|
| 4,147,406 | 4/1979 | Anderson | 350/96.23 |
| 4,374,608 | 2/1983 | Anderson | 350/96.23 |
| 4,375,313 | * 3/1983 | Anderson et al. | 385/103 |
| 4,505,541 | * 3/1985 | Considine et al. | 385/107 |
| 4,645,298 | * 2/1987 | Gartside, III | 385/103 |
| 5,061,823 | * 10/1991 | Carroll | 174/105 R |
| 5,212,755 | 5/1993 | Holmberg | 385/107 |
| 5,274,725 | 12/1993 | Bottoms, Jr. | 385/105 |
| 5,325,457 | 6/1994 | Bottoms, Jr. et al. | 385/113 |
| 5,345,525 | 9/1994 | Holman et al. | 385/104 |
| 5,371,825 | * 12/1994 | Traut | 385/109 |
| 5,557,698 | 9/1996 | Gareis et al. | 385/101 |
| 5,841,072 | * 11/1998 | Gagnon | 174/110 F |

* cited by examiner

Primary Examiner—Robert H. Kim
Assistant Examiner—Sang H. Nguyen
(74) Attorney, Agent, or Firm—Allan M. Wheatcraft; Eric J. Sheets

(57) ABSTRACT

A crush, kink, and torque resistant, flexible fiber optic cable having a closely spaced, spiraled, rigid, metal wire layer disposed around the cable. Small size, light weight, good flexibility with minimum spring-back and excellent crush resistance are provided, along with excellent kinking and torque resistance.

14 Claims, 2 Drawing Sheets

RUGGEDIZED FIBER OPTIC CABLE

FIELD OF THE INVENTION

This invention relates to fiber optic cables and, more particularly, to a fiber optic cable that is ruggedized to be resistant to crushing, torquing, and excessive bending of the internal optic fiber.

BACKGROUND OF THE INVENTION

Fiber optic cables are used for a variety of applications. A fundamental problem associated with the use of fiber optic cables is the inherent fragility of glass fibers. This fragility renders it difficult to form a flexible cable that can withstand bending, twisting, impact, vibration, and other types of stress.

Failures in glass fiber elements typically result from surface flaws or imperfections in the fiber elements. The stress concentration at such surface flaws may be many times greater than the nominal stress at the same point. Because there is no axial yielding in glass fibers, stress at surface flaws cannot be relieved. If a high tensile stress is applied to a glass fiber, surface flaws may propagate with eventual failure of the fibers. Thus, it is necessary that the fiber optic elements be protected from crushing forces or other forces which might nick the surfaces of the fiber optic elements to create points of high stress concentration, while at the same time providing a flexible fiber optic cable. The various types of damage (denting, crushing, kinking, twisting, etc.) often occur during installation and use due to the cable being bent over sharp objects, clamped too tightly, struck by another object, twisted, or bent beyond its minimum bend radius.

U.S. Pat. No. 4,147,406 to Anderson provides one approach for solving this problem. In Anderson, a fiber optic cable is provided wherein a spiral-cut, nonmetallic tube is applied over a glass fiber optic core comprised of one or more fiber optic element bundles cabled along an axial strength member having greater tensile strength and lower elongation per unit length than the fiber optic elements. Using this construction, the axial loading to which the cable may be subjected is taken by the axial strength member rather than subjecting the fiber optic bundles to undesirably high tensile forces. A thin-walled, nonmetallic jacket over the spiral-cut, nonmetallic tube and, optionally, a textile braid or serve layer between the cabled fiber optic bundles and the spiral-cut tubing are also provided in Anderson for improved abrasion resistance. Although this device provides some protection for the fiber optic cable, a more crush resistant fiber optic cable than that produced according to Anderson is desirable.

U.S. Pat. No. 5,061,823 to Carroll describes a crush-resistant coaxial transmission line. This patent describes a spiraled, rigid, metal wire layer between the outer conductor of the coaxial transmission line and the outer jacket of the cable. A ruggedized fiber optic cable would be desirable.

SUMMARY OF THE INVENTION

This invention provides a ruggedized fiber optic cable having greatly increased resistance to crushing, kinking, and torquing. Specifically, the invention provides a ruggedized fiber optic cable having an optic fiber core; a layer of rigid metal wire spiraled around the core at a minimum angle of 45° to the axis of the cable; and at least one layer of mechanical braid surrounding the layer of rigid metal wire. The inventive cable has a crush resistance of greater than 150 pounds per linear inch, preferably greater than 200 pounds per linear inch, more preferably greater than 250 pounds per linear inch, more preferably still greater than 350 pounds per linear inch, and most preferably at least 450 pounds per linear inch.

In another embodiment, the invention provides a ruggedized fiber optic cable having an optic fiber core; a fluoropolymer first jacketing material surrounding the fiber; braided aromatic polyamide plastic fibers surrounding the first jacketing material; a fluoropolymer second jacketing material surrounding the aromatic polyamide plastic fibers; an expanded PTFE buffering layer surrounding the second jacketing material; a PTFE first jacket surrounding the buffering layers; a layer of rigid metal wire spiraled around the first jacket at a minimum angle of 45 degrees to the axis of the cable; at least one layer of mechanical braid surrounding the rigid metal wire; a PTFE second jacket disposed around the mechanical braid; and wherein the cable has a crush resistance of at least 450 pounds per linear inch.

DETAILED DESCRIPTION OF THE INVENTION

Figure 1:
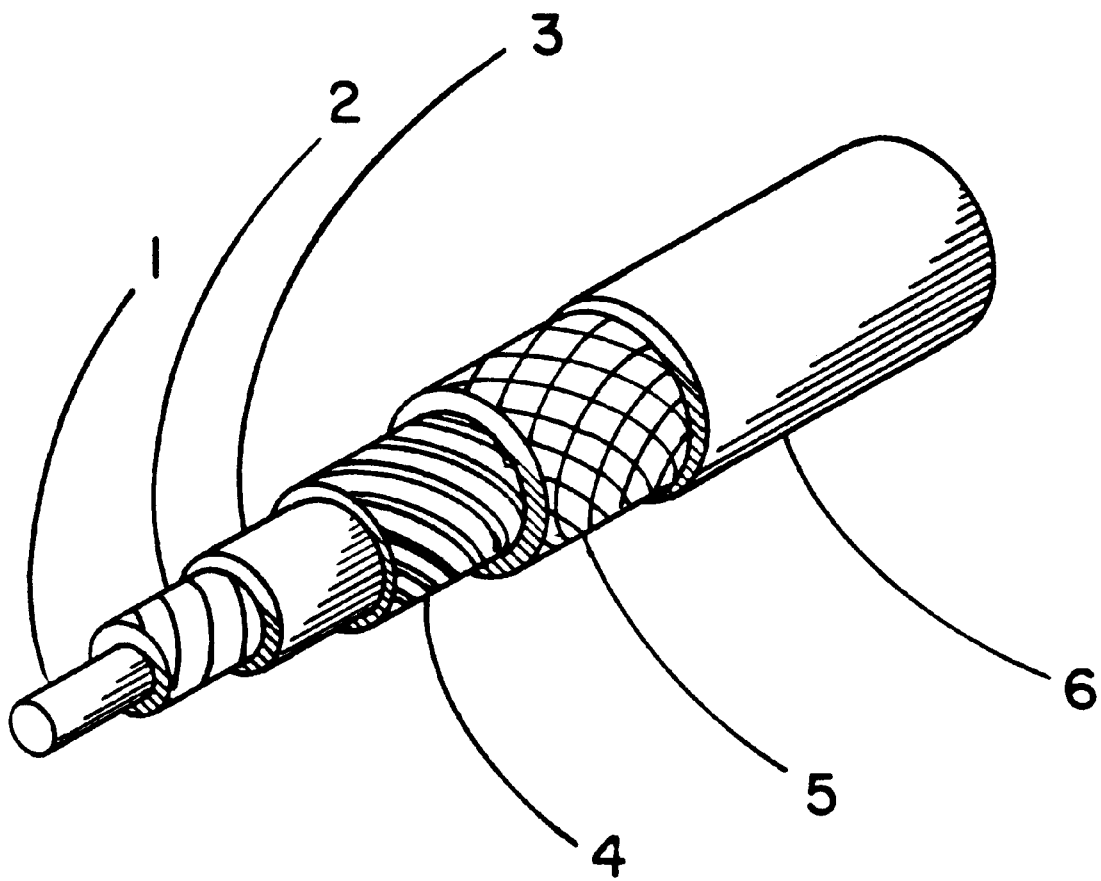
FIG. 1 is a side view of a cable according to an exemplary embodiment of this invention with the layers cut away for display.

FIG. 1 illustrates a preferred embodiment of the invention. An optic fiber 1 forms the core of the inventive cable. Optic fiber 1 is formed of any known material suitable as an optic fiber. Optic fiber 1 may have a cladding (not shown in FIG. 1) surrounding it. The cladding is used for the purpose of overall mechanical durability and forcing the light to remain within the core of optic fiber 1, and is typically made of glass or plastic.

Surrounding optic fiber 1 is a buffering layer 2. Buffering layer 2 is used for the purpose of cushioning optic fiber 1 from external forces. Buffering layer 2 is typically made of expanded polytetrafluoroethylene (PTFE), although any other known suitable cushioning material may be used.

An extruded polymer layer 3 of PTFE or other suitable material surrounds buffering layer 2. Polymer layer 3, which may also be helically or spirally wrapped rather than extruded, serves as a separator which surrounds and separates buffering layer 2 from a layer 4. Layer 4 is a rigid, closely-spaced, spirally or helically wrapped wire at a relatively steep angle (45°–65° or greater relative to the cable axis) with the coils thereof close together but separated from each other. The spacing of the coils may be varied from being in contact to being separated to provide greater crush resistance or greater flexibility, respectively. At least a small space between the coils is preferred for flexibility while retaining maximum crush resistance. Placing the spiral wires close together provides a bend radius limiting mechanism, i.e., resists kinking. Layer 4 of rigid wire provides excellent crush resistance to the fiber optic cable. Layer 4 of rigid spiral wire is preferably made of stainless steel, phosphor bronze, silver-plated copper-clad steel, or similar hard materials. Layer 4 of rigid wire may be a single end of wire or a group of parallel wires. The wire of layer 4 is applied at a relatively steep angle of lay in closely spaced spirals to maximize crush resistance and resistance to kinking. Layer 4 thus serves to ruggedize the cable by increasing the crush and torque resistance of the cable and increasing the resistance to kinking.

A mechanical braid 5 surrounds rigid wire layer 4. Mechanical braid 5 is preferably formed from silver-plated copper, silver-plated copper-clad stainless steel, stainless steel wires or strands, strong aromatic polyamide plastic fibers or strands, such as Nomex® or Kevlar® fiber, or any combination of the listed materials.

To protect the fiber optic cable from the environment, an outer jacket 6 surrounds mechanical braid 5. Outer jacket 6 may be extruded over the cable or applied by other means, for example a braided expanded PTFE fiber, or may be optionally omitted all together. Suitable materials useful for jacket 6 include PTFE, tetrafluoroethylene/hexafluoropropylene copolymer (FEP), tetrafluoroethylene/(perfluoroalkyl) vinyl ether copolymer (PFA), polyvinyl chloride, and polyurethane, for example.

Figure 2:
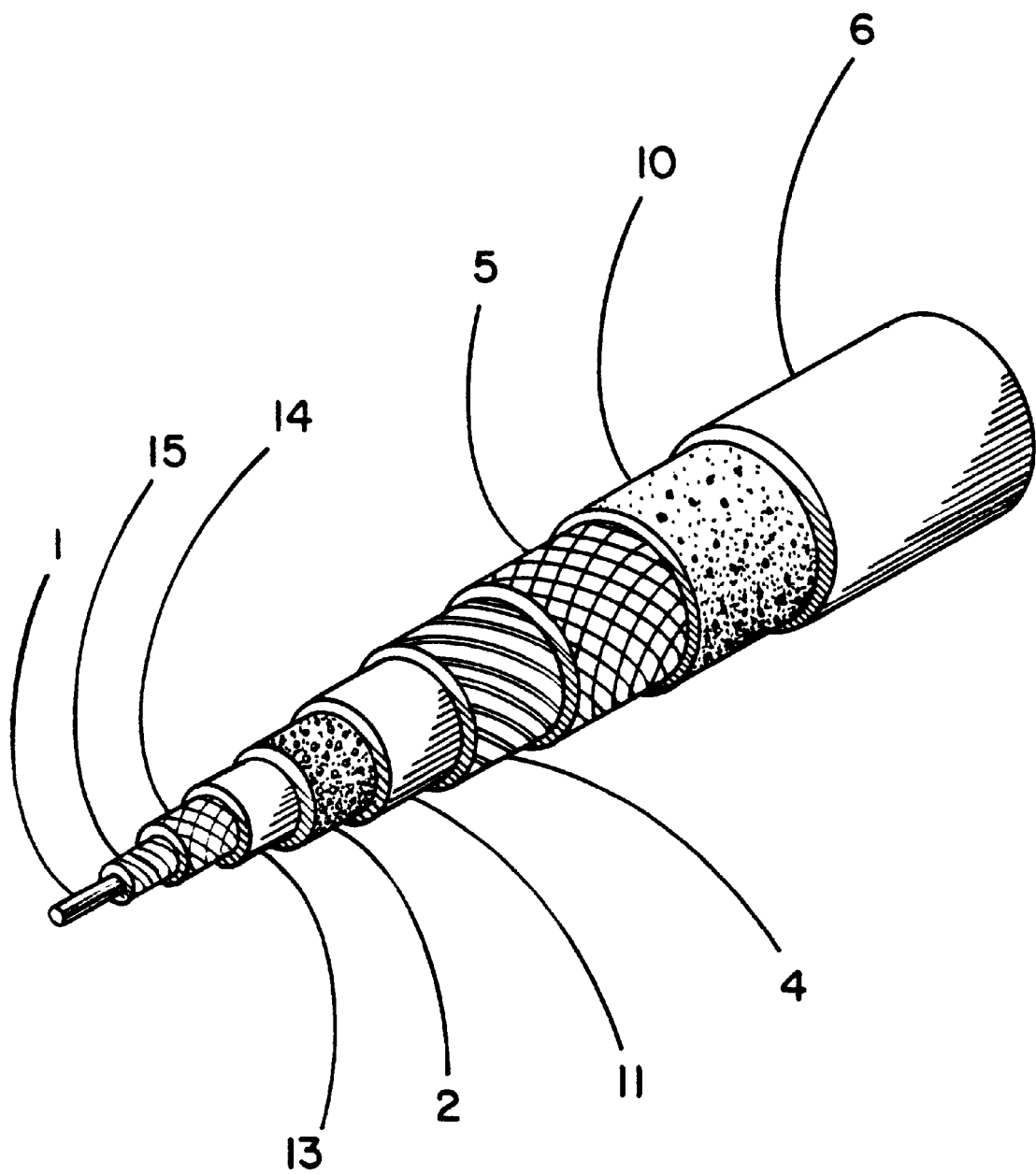
FIG. 2 is a side view of a cable according to another exemplary embodiment of this invention with the layers cut away for display.

FIG. 2 illustrates an alternative embodiment of the present invention. Like numbers designate like parts in FIGS. 1 and 2. In the embodiment illustrated in FIG. 2, optic fiber 1 is surrounded by a layer 15, which, is a jacketing material typically in the form of extruded or helically served PFA or FEP. A layer of ePTFE (not shown) is disposed between optic fiber 1 and layer 15.

A layer 14 of strength fibers is included to provide additional strength to the cable. The fibers may be Kevlar® or any similar material. Typically, these fibers are braided.

Layer 13 is a jacketing material, typically in the form of extruded or helically served PFA or FEP. Surrounding layer 13 is buffering layer 2 with a first extruded polymer jacket 11 surrounding it. Extruded polymer jacket 11 has the same construction as extruded polymer jacket 6. Alternatively, polymer jacket 11 may be a braided polymer, such as expanded PTFE fiber.

Layers 4 and 5 are of the same construction and purpose as described above in connection with FIG. 1. Layer 10 is optionally used if polymer jacket 11 is a braided material. In this case, layer 10 is a sticky binder, such as PTFE with a silicone pressure sensitive adhesive, used with the braid and adapted to adhere it to outer jacket 6. Preferably, the outer diameter of the inventive cable is less than 0.16 inches.

Using the present invention, a fiber optic cable is provided that resists crushing, torquing, and excessive bending of the internal fiber. This cable resists damage caused by the harsh environment of many test and field applications. The design also limits the temporary attenuation caused by mechanical forces which may not permanently damage the cable but may degrade the performance during use. The protection of the fiber provided by this invention results from the mechanical or other damaging forces exerted on the cable being taken or absorbed by the protective layers around the fiber rather than by the fiber itself. In particular, the rigid metal wire spiraled around the fiber and the mechanical braid deflect much of these forces away from the fiber to protect it.

The crush resistance of a fiber optic cable produced according to this invention has been measured. The test was performed on the embodiment of this invention described above in connection with FIG. 2. The crush resistance was measured in pounds per linear inch. The criterion for pass/fail was a change in optical transmittance of less than 0.1 decibels (dB). "Crush resistance" as used herein thus means the pounds per linear inch exerted on a cable that causes a degradation in optical transmittance of the cable of 0.1 dB. Physical deformation was not used as the failure criterion because the cable will bend/crush long before the fiber will break. The cable was slowly compressed between two plates of a known area/length. A simple pneumatic compression device was used, but any device with a force gauge will work (Instron or similar equipment). The force gauge measures the force applied on the cable between the plates. On the tests that were performed on the cable of this invention, the maximum achievable pressure with the device was reached (450 pounds/inch), and no failures were observed. The force value reading on the gauge was divided by the length of the cable between the plates to derive pounds per linear inch. The inventive cable thus has a crush resistance of at least 450 pounds/inch, but certainly above 250 pounds/inch. Typical cable requirements call for a crush resistance of greater than 150 pounds/inch. A competitive fiber optic cable offers a strength of approximately 250 pounds per linear inch, but uses fiber breakage as the pass/fail criterion, rather than merely optical transmission degradation. Therefore, 250 pounds/inch achieved with this invention using the stated test for crush resisstance is actually very much stronger than a conventional device offering such strength using breackage as the criterion. Such drastically improved crush resistance for the inventive cable thus provides a significant advantage over the existing devices.

In addition to improved crush resistance, fiber optic cable produced according to this invention also has improved longitudinal strength. When a connector is attached to either or both end of the fiber optic cable, and the connectors and cable are exposed to longitudinal stresses, such as pulling the cable, these stresses are taken by the coil and braid and other protective layers rather than the optic fiber. Accordingly, the cable has improved strength in a longitudinal direction, thereby preventing the cable from breaking or separating from connectors when exposed to such longitudinal forces. This improvement is referred to as "connector pull strength." It also improves connector termination durability, meaning that when connectors are exposed to repeated stresses, there is reduced degradation of the optic fiber and hence of the signal transmitted by the optic fiber over time. Similarly, when the cable itself is flexed, it has a longer flex life than previous devices, meaning that the flexing causes less damage to the fiber and the signal over time.

Other advantages of the inventive cable include low spring back and that it is easily routable. Low spring back means that the cable may be bent and has a reduced tendency to return to its original shape than with previous devices. This makes routing the cable particularly easy because there is not as much resistive force to be overcome ("easily routable").

While particular embodiments of the present invention have been illustrated and described herein, the present invention should not be limited to such illustrations and descriptions. It should be apparent that changes and modifications may be incorporated and embodied as part of the present invention within the scope of the following claims.

What is claimed is:

1. A ruggedized fiber optic cable comprising:
   (a) an optic fiber core;
   (b) a layer of rigid metal wire spiraled around said core at a minimum angle of 45° to the axis of the cable;
   (c) at least one layer of mechanical braid surrounding the layer of rigid metal wire; and wherein the cable has a crush resistance of greater than 150 pounds per linear inch.

2. A ruggedized fiber optic cable as defined in claim 1 wherein said rigid metal wire is selected from a group consisting of stainless steel, silver-plated copper-clad steel, and phosphor bronze.

3. A ruggedized fiber optic cable as defined in claim 1 wherein said mechanical braid is selected from a group consisting of silver-plated copper, silver-plated copper-clad steel, stainless steel and aromatic polyamide plastic.

4. A ruggedized fiber optic cable as defined in claim 1 further comprising a buffering layer disposed around said optic fiber core.

5. A ruggedized fiber optic cable as defined in claim 4 wherein the buffering layer is expanded PTFE.

6. A ruggedized fiber optic cable as defined in claim 1 further comprising an extruded polymer layer disposed around said buffering layer.

7. A ruggedized fiber optic cable as defined in claim 6 wherein the extruded polymer layer is PTFE.

8. A ruggedized fiber optic cable as defined in claim 1 further comprising a jacket disposed around said mechanical braid.

9. A ruggedized fiber optic cable as defined in claim 8 wherein said jacket is formed of a material selected from the group consisting of ePTFE, PTFE, FEP, PFA, polyvinyl chloride, and polyurethane.

10. A ruggedized fiber optic cable as defined in claim 1 wherein said cable has a crush resistance of greater than 200 pounds per linear inch.

11. A ruggedized fiber optic cable as defined in claim 1 wherein said cable has a crush resistance of greater than 250 pounds per linear inch.

12. A ruggedized fiber optic cable as defined in claim 1 wherein said cable has a crush resistance of greater than 350 pounds per linear inch.

13. A ruggedized fiber optic cable as defined in claim 1 wherein said cable has a crush resistance of at least 450 pounds per linear inch.

14. A ruggedized fiber optic cable comprising:
  a. an optic fiber core;
  b. a fluoropolymer first jacketing material surrounding said fiber;
  c. braided aromatic polyamide plastic fibers surrounding said first jacketing material;
  d. a fluoropolymer second jacketing material surrounding said aromatic polyamide plastic fibers;
  e. an expanded PTFE buffering layer surrounding said second jacketing material;
  f. a PTFE first jacket surrounding said buffering layers;
  g. a layer of rigid metal wire spiraled around said first jacket at a minimum angle of 45 degrees to the axis of the cable;
  h. at least one layer of mechanical braid surrounding said rigid metal wire;
  i. a PTFE second jacket disposed around said mechanical braid; and
  j. wherein said cable has a crush resistance of at least 450 pounds per linear inch.

* * * * *